(Model.)
E. S. LENOX.
Bale-Tie.
No. 228,767. Patented June 15, 1880.
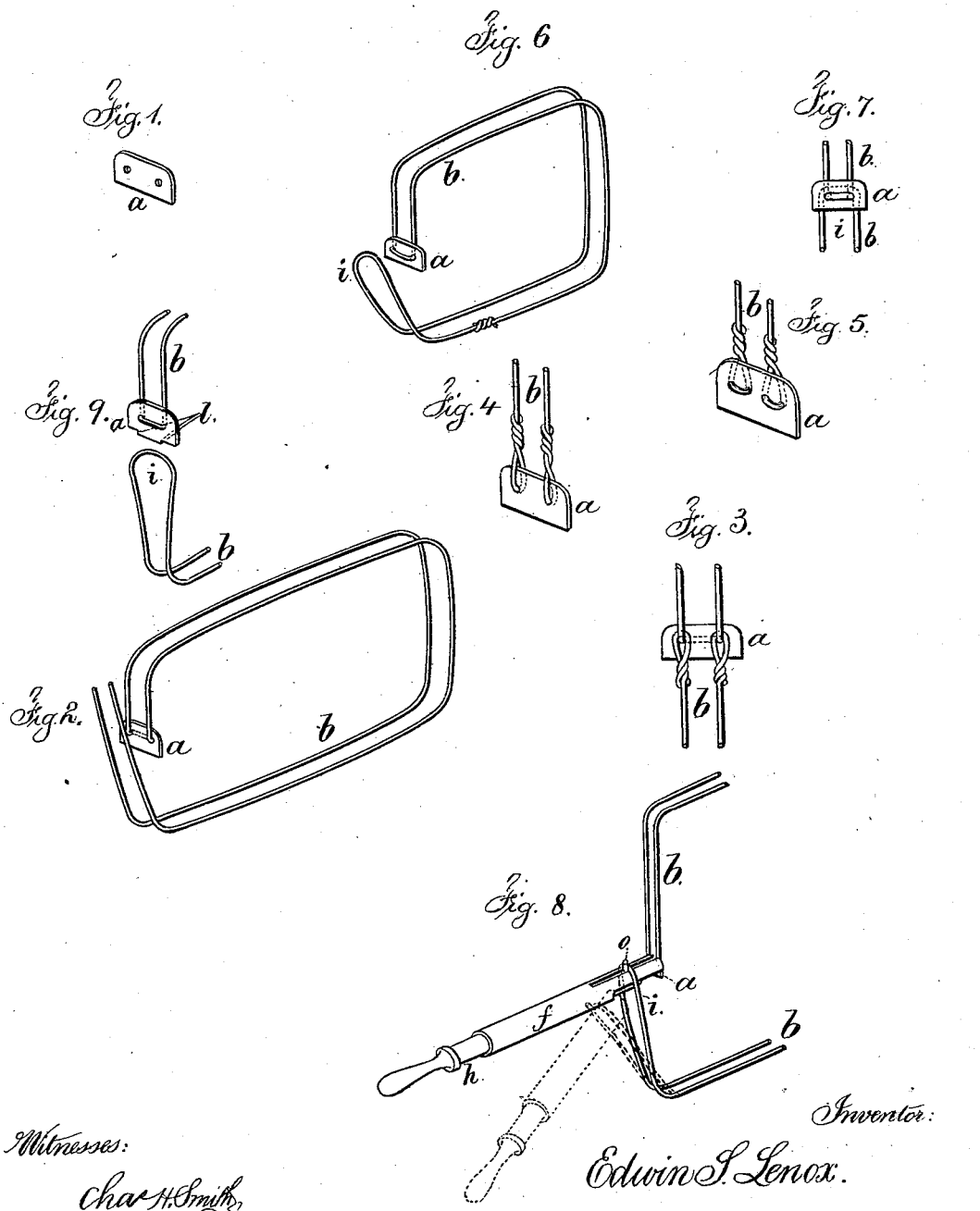
Witnesses:
Chas. H. Smith,
Geo. T. Pinckney.
Inventor:
Edwin S. Lenox.
per Lemuel W. Serrell
atty.

UNITED STATES PATENT OFFICE.

EDWIN S. LENOX, OF NEW YORK, N. Y.

BALE-TIE.

SPECIFICATION forming part of Letters Patent No. 228,767, dated June 15, 1880.

Application filed May 19, 1880. (Model.)

*To all whom it may concern:*

Be it known that I, EDWIN S. LENOX, of the city and State of New York, have invented an Improvement in Bale-Ties, of which the following is a specification.

The object of this invention is to furnish a wire bale-tie that is adapted to the cotton or other bale when it is first put up, and which is easily altered in its length so as to be adapted to the bale after it has been compressed for shipment, and is easily put upon the bale under strain, thereby rendering it unnecessary to apply new bands or ties to the bale when compressed.

I make use of a wire that is double and passes in that condition around the bale. At one end there is a metallic connection, with an opening or perforations through which the wire passes, and this serves to keep the two parts of the wire at the proper distance apart, so that they will not draw closely together by the strain, and also to connect the double-wire band after it has been passed around the bale. The double-wire bale-band is made endless by joining the ends of the wire.

In the drawings, Figure 1 represents a metallic connection in which are the perforations. Fig. 2 represents the bale-band of the double wires and the ends ready to be inserted and twisted, as seen in Fig. 3. This may be used for the bale when first put up. Figs. 4 and 5 are perspective views, illustrating that the ends of the wire of the double bale-band may be united to the connecting-plate by twisting the same into loops instead of passing the wire through the holes in the manner shown in Fig. 2. Fig. 6 shows the bale-band shortened and made endless by twisting the ends together. Fig. 7 represents the loops and metallic connection interlocked in the form they assume upon the compressed bale; and Fig. 8 is a perspective view, illustrating the manner of straining the bale-band. Fig. 9 represents a modification of the metallic connection.

The metallic connection $a$ is provided with an opening or holes through which the wire or wires $b$ are threaded, and this wire passes around the bale double, and the distance apart should be about an inch, more or less. This prevents the bagging of the bale or the cotton being cut by the wire and lessens the expansion of the material of the bale between one tie or band and the next. The plate $a$ maintains the proper distance between the wires where the ends of the band come together.

The ends of the wires may pass through the holes in the plate $a$ and be twisted back and around the body portions of the wire, as indicated in Fig. 3, but it is generally preferable to join the ends after the wire has been threaded through the plates $a$. In either case the end or ends of the double band will be looped and drawn down between the plate and the other parts of the wire.

When the bale is to be compressed for shipment the wire $b$ is cut so as to allow of its being shortened. If the wire has been attached to the plate $a$, as shown in Figs. 4 and 5, its ends may be cut entirely off and separated from the plate $a$, and be reinserted in such plate and again twisted together, the wire $b$ being shortened to the proper length, and the loop or bight $i$ of the band (shown in Figs. 6 and 9) hooked over the plate $a$, as before; but instead of doing so the two parts of the wire may be separated at the bight or bend and the loose ends threaded through between the plate $a$ and the portions of the wire $b$ that project from the same, and then the wires will be drawn up and bent back and twisted upon themselves, as seen in Fig. 3, thus allowing the same double band and plate to be used twice; or the wire band may be made endless by joining the ends, as in Fig. 6. If the band has been used, the same will require to be shortened by cutting out the joint and reuniting the ends with the band of the proper length.

The method in which these bale-bands are to be employed is illustrated in Fig. 8. The lever $f$ is passed through the loop $i$ at the end of the bale wire or band, and its end takes a bearing in the loop at the other end of the bale-wire, or against the metallic connection $a$, as shown by dotted lines, and the lever can now be used to tighten up the band around the bale as the pressing progresses. The loop of wire around the lever is to be pressed off the end of the lever, and for this purpose I prefer to make use of a forcing device in the form of a rod, $h$, within the tubular lever, with a stud, $o$, projecting through a slot in the tube and acting upon the band-loop, or else a tubular forcer may be used around the lever. The lever is withdrawn or removed from the loops after the loops are secured by the connecting device.

The connecting device may have a prong, $l$, as shown in Fig. 9, to be driven into the bale, and the forcer may be used for driving this in as the strain is applied to the band.

If desired, a metallic connecting device in the form of a spike or nail may be passed through the two loops of the double bale-band into the bale or diagonally against its surface after the band has been strained, the slot in the tubular lever allowing this to be done. If the lever, Fig. 8, is turned the other side up, the tube $f$ will form a trough, into which may be laid the metallic connection in the form of a nail or spike, to be driven by the forcer $h$ through the loops and into the bale.

I am aware that flat or hooped iron has been used for cotton-bales. If a round wire of the same section as a flat band were used, it would be too stiff to allow of its being drawn up. By using two wires, or the wire double, I am able to use round wire, and it is sufficiently flexible to accommodate itself to the bale, and it can be strained up tightly to prevent expansion of the bale after compression. The galvanizing of wire is less expensive than of bands, and a saving is effected, and the cotton is not injured, and the double wires of the bands are more evenly distributed upon the bale than could heretofore be accomplished by the same amount of metal in the bands heretofore used.

I am also aware that bag-fastenings have been made of two wires; but they were composed of several links united by eyes, and were not adapted to bale-ties, because the eyes would separate by the strain due to the expansion of the bale.

I claim as my invention—

1. A bale-band made of wire, doubled and joined so as to be endless and adapted to be passed around a bale, and the bends or loops connected, substantially as set forth.

2. The combination, with a double-wire bale-band, of a separate metallic connection to hold the parts of the band when brought together, substantially as set forth.

3. The combination, with a double-wire bale-band, of a metallic connection with an opening or holes through which the wires pass, and adapted to receive the loop or bight of the wire behind such connecting-piece and against the other part of the wire, substantially as set forth.

4. The combination, with the lever for straining the bale-band, of a forcing device moving endwise of the lever, and serving to discharge the loop of the bale-band, substantially as specified.

5. The method herein specified of applying bands to bales, consisting in inserting a lever through a loop at one end of the band, resting the end of the lever in a loop or upon a bearing at the other end of the band, straining the band by the action of the lever, and pushing the loop off the lever upon the connecting device of the band, substantially as specified.

6. The combination, with the lever for straining the bale-tie, of a forcing device acting endwise of the lever against the metallic connection to force the same into the bale, substantially as specified.

Signed by me this 26th day of August, A. D. 1878.

EDW. S. LENOX.

Witnesses:
WILLIAM G. MOTT,
HAROLD SERRELL.